Sept. 1, 1964

D. H. BANZHAF 3,146,631

GOVERNOR ASSEMBLY

Filed March 21, 1962

INVENTOR.
DONALD H. BANZHAF
BY
Bayard H. Michael
ATTORNEY

Sept. 1, 1964 D. H. BANZHAF 3,146,631
GOVERNOR ASSEMBLY
Filed March 21, 1962 2 Sheets-Sheet 2

INVENTOR.
DONALD H. BANZHAF
BY
*Bayard H. Michael*
ATTORNEY

United States Patent Office 3,146,631
Patented Sept. 1, 1964

3,146,631
GOVERNOR ASSEMBLY
Donald H. Banzhaf, Brookfield, Wis., assignor to Harley-Davidson Motor Co., Milwaukee, Wis., a corporation of Wisconsin
Filed Mar. 21, 1962, Ser. No. 181,416
12 Claims. (Cl. 74—472)

This invention relates to a governor particularly suited for controlling the speed of variable diameter sheave drives or the like.

An object of this invention is to provide a simple mechanism for governing the speed of a variable diameter sheave drive mechanism.

It is characteristic of variable diameter sheaves that, as the sheaves are rotating and their diameters varying, axial movement of one sheave half of each sheave occurs. In accordance with this invention, it is proposed to sense this axial movement and through a governor arrangement utilize it in controlling the power source for the drive mechanism.

Other objects and advantages will be pointed out in, or be apparent from, the specification and claims, as will obvious modifications of the single embodiment shown in the drawings, in which:

Figure 1:
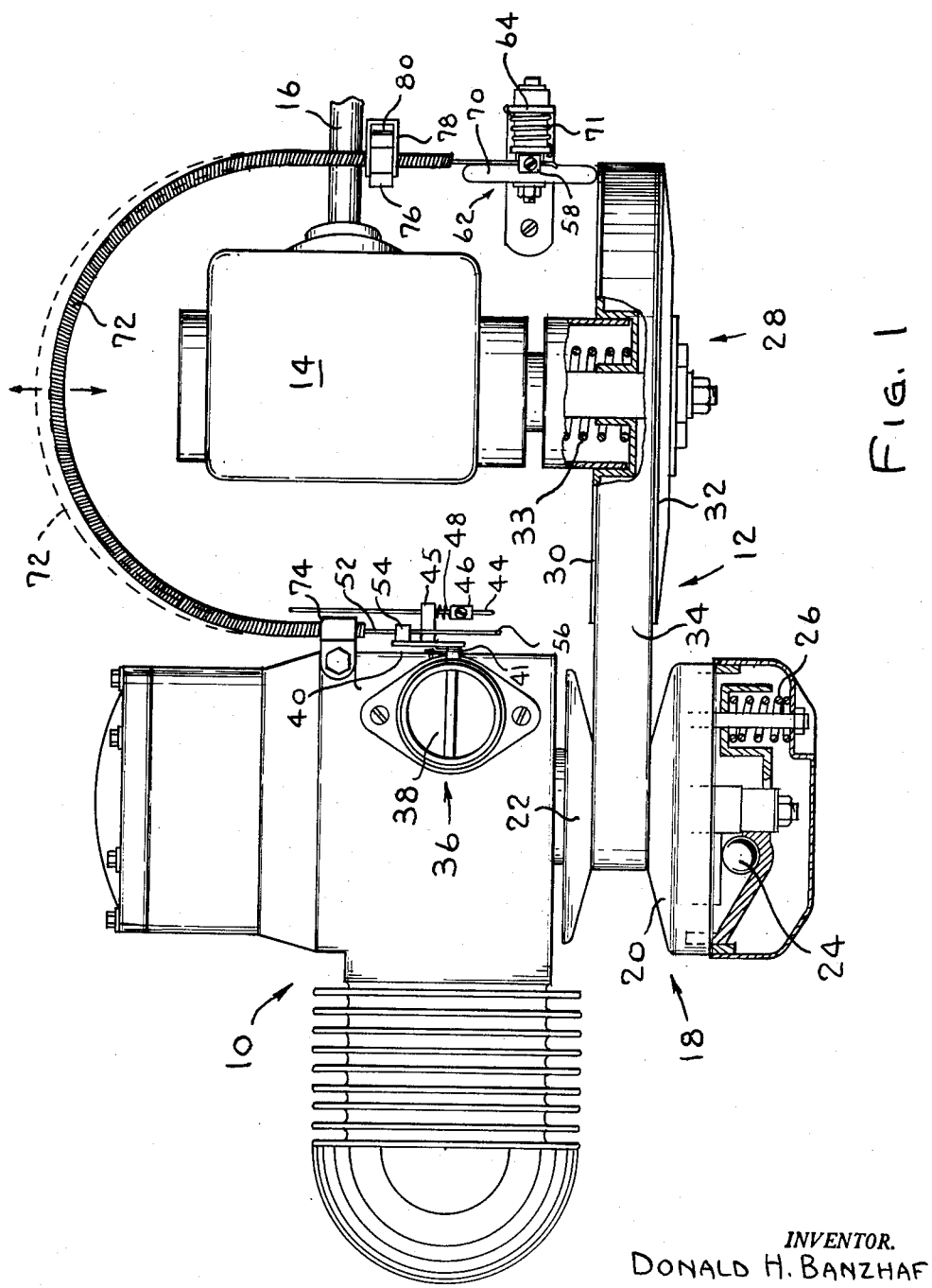
FIG. 1 is a plan view of the power source, drive mechanism and governor arrangement.

With reference to the drawings, a one cylinder engine 10 drives driven shaft 16 through the variable diameter sheave drive 12 and gear box 14. A complete description of sheave drive can be found in the co-pending U.S. patent application of William J. Harley for a "Vehicle Transmission and Control," Serial No. 127,605, filed July 28, 1961, and assigned to the assignee of this application. In such a drive the two sheave halves 20, 22 are driven by the engine drive shaft with the half 22 fixed on the shaft and the half 20 splined on the shaft to allow axial movement. The movable half 20 is biased by a set of springs 26 away from half 22 to give the smallest effective sheave diameter (i.e. low speed) and is moved by balls 24, moving outward under centrifugal force in suitable raceways, to increase the effective diameter as the engine speed increases.

Driven sheave 28 also includes an axially movable sheave half 30 and a stationary sheave half 32 which are biased towards each other, or to a maximum sheave diameter position, by spring 33.

Drive belt 34 connects the driving and driven sheaves and as the rotational speed of the sheave 18 is increased its diameter increases and forces the driven sheave to spread and decrease in effective diameter. Sheave half 20 then moves in accordance with the output speed of engine 10, and correspondingly, movement of belt 34 and sheave half 30 are in accordance with that output so that movement of sheave half 30 is directly related to the output speed of engine 10. In accordance with this invention, this movement of sheave half 30 in accordance with the speed of engine 10 is sensed, translated and sent back to the engine in such a manner that a preselected engine speed can be maintained. It will be appreciated that since sheave half 20 and belt 34 are displaced in accordance with engine speed, their displacement could be utilized as well.

Figure 3:
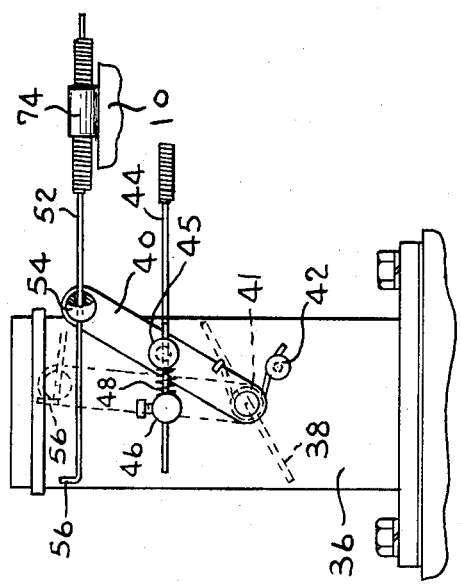
FIG. 3 is a fragmentary view of the control portion of the governor arrangement.
Figure 4:
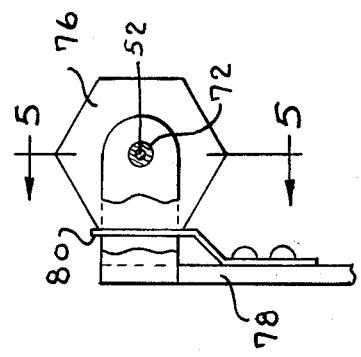
FIG. 4 is a view taken along lines 4—4 of FIG. 2.

More particularly, fuel is supplied to the engine through a carburetor 36 including a throttle valve 38 and a throttle lever 40 connected to the valve. A torsion spring 41 has its ends engaged between a post 42 and lever 40 so that throttle valve 38 is biased toward an open position. The throttle control, for example an accelerator pedal (not shown) biased in the usual manner toward a closed position, is connected to lever 40 through a push-pull cable 44. Cable 44 passes through a sliding block 45 and has a stop 46 fixed to its end. A buffer spring 48 is positioned between the stop and sliding block 45 to prevent damage to the sliding block and/or lever 40. The spring (not shown) holding the accelerator pedal in a closed position exerts a greater force than spring 41 so that it overcomes the bias of spring 41 and, through cable 44, holds the throttle valve in a closed position. Movement of the accelerator pedal to increase the engine speed moves cable 44 to the left as viewed in FIG. 3 thereby allowing lever 40 to move to the left under the influence of spring 41 opening throttle valve 38. Sliding block 45 is pivotally mounted on lever 40 so that it is movable relative thereto without unduly stressing cable 44.

Through a governor arrangement now to be described, the throttle opening can be controlled to maintain a desired speed. This governor arrangement includes a cable 52 which passes through post 54 carried by lever 40 and has a turned up end 56. The other end of cable 52 passes through an anchor block 58 which is carried on one end of a governor arm 60 with the opposite end of the governor arm carrying a sensing roller 62. Governor arm 60 is pivotally mounted intermediate its ends on a bracket 64 which is in turn fixed to a frame member 66. Sensing roller 62 is positioned to engage the face of movable sheave half 30 of sheave 28 and, by means of a torsion spring 71 having its opposed ends anchored between bracket 64 and governor arm 60, is maintained in continuous engagement with disk 30. Sensing roller 62 includes an inner metallic disk 68 and a resilient ring 70 to provide accurate sensing of movement of sheave half 30 while maintaining a quiet and relatively wear free engagement with the sheave unit.

Figure 2:
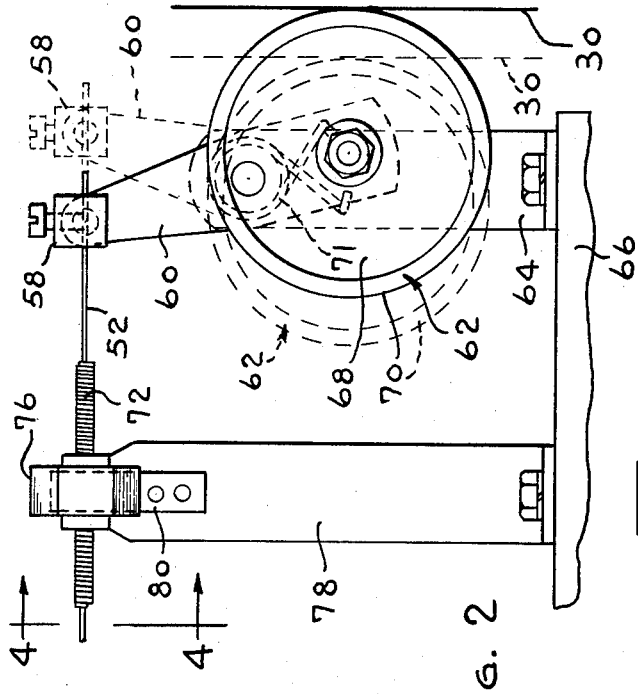
FIG. 2 is a fragmentary view of the sensing portion of the governor arrangement.
Figure 5:
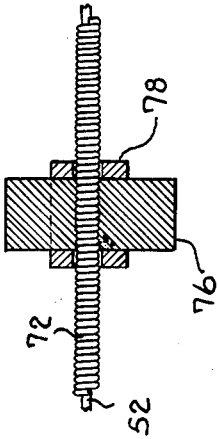
FIG. 5 is a sectional view taken along lines 5—5 of FIG. 4.

In operation, movement of the accelerator pedal to increase the amount of fuel supplied to the engine and increase the speed thereof moves cable 44 allowing the throttle lever and throttle valve to pivot to the left opening the throttle valve. As more fuel is called for cable 44 will continue to move to the left until it reaches its full open position indicated by the dotted lines in FIG. 3. As an increased amount of fuel is being supplied to the motor and its speed increases, the rotational speed of sheave 18 increases causing its diameter to increase displacing belt 34 and moving sheave half 30 of sheave 28 away from sheave half 32. The movement of sheave half 30 is directly related to the output speed of the engine and is continuously sensed by roller 62. As the speed of the engine increases sheave half 30 will move outwardly from stationary sheave half 32 of sheave 28, this will move the sensing wheel and cause governor arm 60 to pivot, see FIG. 2. This movement of governor arm 60 displaces cable 52 to the right (FIG. 2) and correspondingly end 56 of cable 52 moves to the right (FIG. 3) to engage post 54 and hold lever 40 and throttle valve 38 in a position preventing exceeding a predetermined speed. Cable 44 can continue to travel to the left without any further effect on the throttle valve as the throttle valve is held in position by control cable 52 so that regardless of the amount of fuel called for by the accelerator the predetermined speed is not exceeded. Of course, as the load conditions change the governor will adjust the throttle to maintain the proper speed if possible. It will be noted that below the predetermined speed the accelerator pedal is in control of the speed and the governor arrangement prevents fuel flow in an amount sufficient to exceed the predetermined speed.

Although a sliding block has been provided for each of the cables, 44 and 52, it will be appreciated that one sliding block could be provided which would receive both cables.

The governor arrangement is adjustable so that any governed speed can be selected by means of a spiral sheath 72 surrounding cable 52. Sheath 72 is anchored at one end on a bracket 74 affixed to the engine and passes through an adjusting nut 76 mounted on a bracket 78 affixed to frame member 66. The interior of nut 76 is machined to receive the sheath and so that rotation of the nut causes the sheath to be advanced either to the left or the right. Since one end of sheath 72 is fixed relative to carburetor 36 by bracket 74 and its other end is movable relative to the carburetor, rotation of nut 76 causes the sheath to be displaced, i.e. to bow outwardly or inwardly as the nut is rotated (see FIG. 1), and move end 56 of the cable relative to post 54 so that their point of engagement is varied as desired to achieve any desired speed. A flat leaf spring 80 engages the nut and locks it in the desired position.

Although but one embodiment of the present invention has been illustrated and described, it will be apparent to those skilled in the art that various changes and modifications may be made therein without departing from the spirit of the invention or from the scope of the appended claims.

What I claim is:

1. In combination, drive transmission means, a variable speed power source for said drive means, said drive means including a portion movable relative to said drive means, as well as with said drive means, and in accordance with the speed at which said drive means is driven by said power source, sensing means engageable with said movable portion of said drive means for displacement by said movable portion in accordance with the speed of said drive means, and means connecting said sensing means to said power source and operative to transmit said relative movement of said movable portion to said power source for control thereof in accordance with the speed of said drive means so that the speed of said drive means does not exceed a predetermined speed.

2. In combination, a power source, means operative to vary the speed of said power source, drive means for transferring power from said power source and including a portion movable relative to said drive means, as well as with said drive means, and in accordance with the speed at which said drive means is driven by said power source, sensing means engaging said movable portion for movement in response to movement of said movable portion relative to said drive means, and mechanical linkage means connecting said sensing means to said speed varying means for transmitting said motion of said sensing means to said speed varying means for control thereof in accordance with the speed of said drive means so that said power source does not exceed a predetermined speed.

3. In combination, a variable speed power source, means for transferring power from said power source including a driving member connected to and driven by said power source and a driven member connected to and driven by said driving member, said driven member including a portion movable relative to said transmission means in a direction transversely of the direction of driven movement of said driven member and in accordance with the speed at which said driving member is driven by said power source, sensing means engaging said movable portion for movement in response to movement of said movable portion relative to said drive means, and means connecting said sensing means to said power source for transmitting said motion of said sensing means to said power source for control thereof in accordance with the speed of said power transfer means so that said power source does not exceed a predetermined speed.

4. In combination, a variable speed power source, a variable diameter sheave drive including a pair of sheaves connected by a drive belt and means movable in response to variations in sheave diameter, sensing means engageable with and movable in response to movement of said movable means, and means connecting said sensing means to said power source for transferring said sensed movement to said power source for control thereof in accordance with movement of said movable means.

5. In combination, a variable speed power source, a variable diameter sheave drive including a pair of sheaves connected by a drive belt, one sheave half of each of said sheaves being axially movable with consequent displacement of said belt so that said drive includes elements displaceable in accordance with variations in the speed of said power source, and means sensing said displacement of one of said elements and connected to and controlling said power source in accordance with said sensed displacement.

6. In combination, a variable speed power source, a variable diameter sheave drive including input and output sheaves connected by a drive belt, one sheave half of each of said sheaves being axially movable, sensing means engaged with and movable in response to said axial movement of one of said sheave halves, and means connecting said sensing means to said variable speed power source for transferring said sensed movement to said power source for control thereof so that a predetermined speed is not exceeded.

7. In combination, an engine, fuel flow control means for varying the speed of said engine, a variable diameter sheave drive including input and output sheaves connected by a drive belt, one sheave half of each of said sheaves being axially movable, sensing means engaged with and movable in response to said axial movement of said output sheave, and means connecting said sensing means to said fuel flow control means for transferring said sensed movement to said fuel flow control means for control thereof so that a predetermined speed is not exceeded.

8. In combination, an engine, fuel flow control means for varying the speed of said engine and including a throttle valve biased toward an open position, means acting against said bias to hold said throttle valve in a normally closed position and operative to release said throttle valve for movement toward said open position, a variable diameter sheave drive including input and output sheaves connected by a drive belt, one sheave half of each of said sheaves being axially movable, sensing means engaged with and movable in response to said axial movement of said output sheave, and means connected between said throttle valve and said sensing means and movable in response to said movement of said sensing means into engagement with said throttle valve to hold said throttle against its bias to prevent said engine from exceeding a predetermined speed.

9. The combination of claim 8 wherein said connecting means is a control cable connected at one end to and movable with said sensing means, and further including means for connecting the other end of said cable to said throttle valve, and arranged so that said other end of said cable operatively engages said throttle valve at said predetermined speed to prevent said engine from exceeding said predetermined speed and is disengaged from said throttle valve at speeds below said predetermined control speed.

10. The combination of claim 9 including means for adjusting said cable relative to said throttle valve to vary said predetermined speed.

11. A governor arrangement for use in combination with fuel flow control means for an engine and adapted to prevent said engine from exceeding a predetermined speed, said governor arrangement comprising, in combination, a control cable, a pivotally mounted lever, a sensing member carried by said lever, means for moving said sensing member in accordance with the speed of said engine, one end of said cable connected to and movable with said lever in response to movement of said sensing member, and means connecting the other end of said cable to said fuel flow control means so that said other end of said cable is arranged to operatively engage said fuel flow control means at said predetermined speed to prevent said engine from exceeding said predetermined speed and so that said other end of said cable is operatively disengaged from said fuel flow control means when the speed of said power source is below said predetermined speed.

12. The combination of claim 11 including adjusting means comprising a sheath surrounding said control cable and fixed at one end relative to said fuel flow control means and having its other end movable relative to said fuel flow control means, and means engaging said sheath for displacing said other end of said sheath to produce corresponding movement of said other end of said cable relative to said fuel flow control means.

References Cited in the file of this patent

UNITED STATES PATENTS

| | | |
|---|---|---|
| 1,833,908 | Maybach | Dec. 1, 1931 |
| 2,169,267 | McCollough | Aug. 15, 1939 |
| 2,731,849 | Rockwood et al. | Jan. 24, 1956 |
| 2,742,792 | Lacoste | Apr. 24, 1956 |
| 2,977,816 | Rice | Apr. 4, 1961 |

UNITED STATES PATENT OFFICE
CERTIFICATE OF CORRECTION

Patent No. 3,146,631                          September 1, 1964

Donald H. Banzhaf

It is hereby certified that error appears in the above numbered patent requiring correction and that the said Letters Patent should read as corrected below.

Column 2, line 40, for "unit" read -- half --; column 4, line 54, after "throttle", second occurrence, insert -- valve --.

Signed and sealed this 8th day of December 1964.

(SEAL)
Attest:

ERNEST W. SWIDER
Attesting Officer

EDWARD J. BRENNER
Commissioner of Patents